(12) United States Patent
Cornillon et al.

(10) Patent No.: US 8,136,722 B2
(45) Date of Patent: Mar. 20, 2012

(54) METHOD GUARANTEEING PAYMENT FOR ELECTRONIC COMMERCE IN PARTICULARLY BY MOBILE TELEPHONE AND A SYSTEM IMPLEMENTING IT

(75) Inventors: Christophe Cornillon, Meyrargues (FR); Brigitte Vermelle, Lançon de Provence (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 12/558,937

(22) Filed: Sep. 14, 2009
(Under 37 CFR 1.47)

(65) Prior Publication Data
US 2010/0235281 A1  Sep. 16, 2010

Related U.S. Application Data

(63) Continuation of application No. 12/359,722, filed on Jan. 26, 2009, now abandoned, which is a continuation of application No. 12/135,642, filed on Jun. 9, 2008, now abandoned, which is a continuation of application No. 11/907,627, filed on Oct. 15, 2007, now abandoned, which is a continuation of application No. 11/705,136, filed on Feb. 12, 2007, now abandoned, which is a continuation of application No. 11/454,873, filed on Jun. 19, 2006, now abandoned, which is a continuation of application No. 10/976,920, filed on Nov. 1, 2004, now abandoned, which is a continuation of application No. 10/483,294, filed as application No. PCT/FR02/02452 on Jul. 11, 2002, now abandoned.

(30) Foreign Application Priority Data

Jul. 12, 2001 (FR) ...................................... 01 09312

(51) Int. Cl.
*G06Q 40/00* (2012.01)
*G07D 11/00* (2006.01)
*G07F 19/00* (2006.01)

(52) U.S. Cl. ... 235/379; 235/375; 235/380; 235/472.01; 702/1.1; 702/18; 702/44; 702/71; 702/317

(58) Field of Classification Search .................. 235/375, 235/379, 380, 472.01; 705/1.1, 18, 44, 71, 705/317
See application file for complete search history.

(56) References Cited

U.S. PATENT DOCUMENTS

| | | | | |
|---|---|---|---|---|
| 6,092,202 A * | 7/2000 | Veil et al. | ......................... | 726/27 |
| 6,285,991 B1 * | 9/2001 | Powar | ............................. | 705/76 |
| 6,327,578 B1 * | 12/2001 | Linehan | ........................... | 705/65 |
| 6,367,011 B1 * | 4/2002 | Lee et al. | ...................... | 713/172 |
| 6,377,810 B1 * | 4/2002 | Geiger et al. | ............... | 455/456.2 |
| 6,463,534 B1 * | 10/2002 | Geiger et al. | ................... | 713/168 |
| 6,694,025 B1 * | 2/2004 | Epstein et al. | ................. | 380/279 |
| 6,836,765 B1 * | 12/2004 | Sussman | .......................... | 705/75 |
| 6,990,471 B1 * | 1/2006 | Rajaram | ........................... | 705/64 |
| 7,107,248 B1 * | 9/2006 | Asokan et al. | .................... | 705/67 |
| 2002/0026578 A1 * | 2/2002 | Hamann et al. | ................ | 713/159 |
| 2002/0044662 A1 * | 4/2002 | Sowler | ............................ | 380/277 |
| 2002/0116344 A1 * | 8/2002 | Kinoshita et al. | ............... | 705/65 |
| 2003/0163687 A1 * | 8/2003 | Dare et al. | ..................... | 713/157 |

* cited by examiner

*Primary Examiner* — Ali Sharifzada

(74) *Attorney, Agent, or Firm* — Buchanan Ingersoll & Rooney PC

(57) ABSTRACT

An electronic payment method for a retailer using an operator network and a financial organization. During a transaction two certificates are produced; one using an operator key and the other using a banking key. The first certificate is sent to the operator and the other certificate is securely placed under the control of the financial organization.

11 Claims, 4 Drawing Sheets

Sequence of a transaction

Sequence of a transaction

Management of a customer dispute

METHOD GUARANTEEING PAYMENT FOR ELECTRONIC COMMERCE IN PARTICULARLY BY MOBILE TELEPHONE AND A SYSTEM IMPLEMENTING IT

CROSS REFERENCE TO RELATED APPLICATIONS

This application is a continuation of U.S. application Ser. No. 12/359,722, filed Jan. 26, 2009 now abandoned, which is a continuation of U.S. application Ser. No. 12/135,642, filed Jun. 9, 2008 now abandoned, which is a continuation of U.S. application Ser. No. 11/907,627, filed Oct. 15, 2007 now abandoned, which is a continuation of U.S. application Ser. No. 11/705,136, filed Feb. 12, 2007 now abandoned, which is a continuation of U.S. application Ser. No. 11/454,873, filed Jun. 19, 2006 now abandoned, which is a continuation of U.S. application Ser. No. 10/976,920, filed Nov. 1, 2004 now abandoned, which in turn is a continuation of U.S. application Ser. No. 10/483,294 now abandoned, which is based upon International Application No. PCT/FR02/02452, filed Jul. 11, 2002, and French Application No. 01/09312, filed Jul. 12, 2001.

BACKGROUND OF THE INVENTION

The invention concerns a payment method guaranteeing payment to the retailer in the context of electronic commerce carried out using an electronic device such as a microcomputer, a mobile telephone or a personal assistant.

Electronic commerce consists of sending orders to a retailer using electronic equipment connected by a network to the electronic equipment of the retailer.

At the present time commerce is being carried out more and more using the Internet.

Two problems are then encountered.

This is because in the case of electronic commerce provision is made for the payments to be made also electronically, that is to say through the network.

The first problem is to provide security for the payer since the latter has to communicate his credit card or bank account number so that a debit from his account can be made.

The second problem is providing a payment guarantee for the vendor, that is to say for the retailer who supplies goods or a service to the customer.

This second problem is dealt with hereinafter.

A payment mechanism with a mobile telephone will now be detailed.

The retailer sends a payment request to a financial institution, the latter sends this request to the mobile telephone operator. The payer receives a short SMS message on his mobile telephone, he enters his identification code (PIN code) and the transaction is signed by a secret key recorded in the subscriber identification card of the telephone (SIM card). The server of the telephone operator verifies the signature and sends an approval to the financial institution. The payment is managed by the financial institution.

The drawback of this payment circuit stems from the fact that the authentication key used for the signature of the transaction is generated by and known to the telephone operator. This means that the financial institution cannot give a guaranteed payment to the retailer since the signature may be reproduced by a third party.

The lack of guarantee of the payment for the merchant is the major drawback of this mechanism.

A second known solution is the MOTO payment system, payment by Internet. The MOTO system: Mail Order Telephone Order, is the simplest system for making payments by Internet. This is because the system consists of communicating the credit card number vocally (on the telephone) or through the Internet to the retailer at the time of the order. This solution exists for electronic devices such as PCs and can of course be reproduced for transactions made with a mobile telephone.

The drawback of this method stems from the fact that the presence of the card is not proved by the retailer since the authentication of the holder of the card is not carried out during the transaction. In this case also, the guaranteed payment is not assured for the retailer. And unfortunately there are a large number of frauds in the whole world with the MOTO payment system which has just been described.

A third solution is known for payments on the Internet; this is the SET procedure: Secure Electronic Transaction. This procedure corresponds to a payment protocol which has been developed by a consortium of companies such as Visa, Mastercard, Europay and IBM. The SET protocol is dedicated to Internet commerce and provides a guarantee of payment for the retailer. This solution requires a logistical implementation which is very laborious for the server of the retailer and for loading the certificates of the payer.

The drawback of this method stems from the fact that it requires laborious logistics impossible to implement on portable devices such as a personal assistant or a GSM mobile telephone or other or on a new-technology WAP telephone.

Naturally a fourth solution, conventionally used outside electronic commerce, consists of directly paying at the retailer with one's credit card. It will be understood that this solution is not adapted to payment at a distance.

The MOTO (Mail Order Telephone Order) system is, as has been seen, the traditional method for making payments at a distance. Fraud with the MOTO system through the Internet and mobile telephone networks (principally for the prepaid market) has grown in a way which has been accelerating over the past few years. The payment card is considered not to be present for such purchases and thus the bank cannot guarantee a payment to retailers.

Only the standard solution which provides a guarantee of payment for the retailer is the SET solution for electronic commerce. However, as has been emphasised, this solution requires laborious logistical implementation for the loading of certificates for the payers and the deployment of this solution is still very slow.

All the payment schemes, in particular using a mobile telephone, at the present time present each of the technical drawbacks.

The solution proposed makes it possible to make payment for goods and services. It is independent of the channel used for "placing the order", namely microcomputer (PC) on the Internet or "face to face" in a shop, mobile telephone, fixed telephone, personal assistant or post.

The solution can also be used in countries for which bank credit cards are not yet very developed.

The purpose of the present invention is to remedy the aforementioned drawbacks.

SUMMARY OF THE INVENTION

The present invention concerns a "global circuit" for payment using an electronic payment device affording a guarantee of payment for the retailer.

This is because the solution aims to remedy the problems set out by affording a solution based on existing technologies but drastically limiting fraud in the case of sale by correspondence.

The solution consists more particularly of providing two keys for authenticating the payer, a key dedicated to the telephone operator and a key dedicated to the financial body. It may be a case of a bank or any other body, for example an insurance company. However, bank will be spoken of hereinafter in order to simplify, and bank key.

The two keys make it possible to produce two certificates, cert1 and cert2.

Certificates for the transaction mean a set of data unequivocally characterising the transaction and the parties present (in practice the customer and the retailer) and certifying that the customer has been authenticated. In practice, it is a case of data representing the transaction and the retailer (amount, time dating, retailer identifier, currency used etc) and an electronic signature calculated on an impression (that is to say a summary) of these data and ensuring the integrity of the transaction and authenticating the customer.

The certificate cert1 is therefore obtained with the key K1 and the certificate cert2 is obtained with the key K2. Hereinafter certificates and electronic signatures will be spoken of indifferently.

The telephone operator will be able to verify the certificate only with the operator key.

Only the bank of the holder of the SIM card (the bank of the customer) will be able to verify the certificate produced with the key which is dedicated to it. There are thus two certificates produced from distinct keys, one of which is a bank key. The retailer or the telephone operator cannot reproduce the certificate dedicated to the bank since they do not have the bank key. The payment is considered to be guaranteed for the retailer by the banking organization.

This requires the signature key to be loaded in a secure manner, for example in a SIM card, without intervention from the telephone operator.

The present invention procures the following advantages:

There is no need to modify the banking authorization network. The signature produced with the bank key is verified by the banking organization solely in the case of dispute from the payer, in the example described, it will be a case of the holder of the SIM card.

There is no need to modify the normal technique of personalisation of the SIM cards. It is only necessary to add a procedure of loading secret data linked to the digital signature (bank key).

A guarantee of payment is provided for the retailer.

It is not necessary to change the mobile telephone in order to implement this guaranteed payment mechanism.

In addition this solution can apply to other networks allowing electronic commerce: purchase on the Internet, purchase by voice order and payment from a mobile telephone network (GSM or other).

The object of the invention is therefore a method of electronic payment for a retailer using a communication means utilizing a network of an operator and a financial organization, principally characterised in that it consists, at the time of a transaction, of producing two certificates, one using an operator key, the other using a bank key, transmitting the first certificate to the operator and placing the other certificate under the control of the financial organization in a secure manner.

According to a variant, certificates are produced by a smart card and in that the second certificate is stored on this card.

According to another variant, the second certificate is transmitted to the operator, who stores it on a database under the control of and/or with the approval of the financial organization.

According to another variant, the second certificate is sent to the bank either by the smart card or by the operator.

According to one implementation, the payment means is a mobile telephone.

Advantageously, the mobile telephone comprises a subscriber identification smart card (for example SIM on the GSM network, UIM on the CDMA network, USIM on the 3G network), the network of the telecommunication operator is equipped with a management and invoicing server, the method consisting of:

for the mobile telephone: sending the two certificates to the telecommunication operator, for the management and invoicing server: authenticating the holder of the card from the first certificate and sending a payment authorization to the financial organization.

Another object of the present invention concerns an electronic payment device comprising means for accessing a network, principally characterised in that it comprises at least two keys, an operator key K1 and a bank key K2, for producing two certificates representing a transaction.

According to the invention, the electronic payment device consists of a microcomputer or a mobile telephone or a personal assistant.

Advantageously, the device constitutes a secure medium with an electronic chip.

According to one embodiment, the device is able to produce the certificates.

Another object of the invention is a management and invoicing server connected to a network of a telecommunication operator for invoicing goods or services supplied by a retailer to a customer performing electronic transactions on the network by means of an electronic payment means, principally characterised in that it comprises means of processing operator certificates relating to the transactions, and in that it comprises means of putting under the control of bank certificates relating to the said transactions.

BRIEF DESCRIPTION OF THE DRAWINGS

Other particularities and advantages of the invention will emerge clearly from the following description given by way of non-limiting example with regard to the accompanying figures, which show.

DETAILED DESCRIPTION

The example described below concerns electronic commerce with a mobile telephone. The solution proposed uses a SIM ToolKit (STK) payment application, that is to say an STK application program loaded in a SIM card.

The SIM ToolKit payment application program is loaded in the SIM card of the customer at the time of the card personalisation step. This program can also be downloaded using the radio network, this depending on the technical characteristics of the SIM card used.

Once this application is activated, the bank owning the card can format, sign and send payment requests by means of SMS short messages intended for the mobile telephone equipped with this card.

The transactions performed by the card holder (also referred to as the customer) are signed after presentation of the payment PIN by the customer. The algorithm used for producing the certificates and in this case generating signatures is stored in a program memory of the card. It may be a case of an algorithm using symmetrical cryptography with the DES or 3DES algorithm or asymmetric cryptography with the RSA algorithm.

It should be stated that, during a transaction with a retailer, the point of sale reading device implements two main security functions: the authentication of the payment card involving the card and the reader and the authentication of the holder of this card.

In the world of mobile telephones, the authentication of the bank card is based on a preliminary registration of the customer, this is performed once and for all. The exchanges which are made during this registration step between the various items of equipment of the participants are set out below and illustrated by FIG. 1.

In addition, the authentication of the holder of the card is carried out at each transaction through or at least by means of the identification code dedicated to the card holder, this code having to be entered by the card holder. This identification code, also known as the PIN code (Personal Identification Number) will be referred to as the bank code in the remainder of the description since it is supplied by the bank to its customer. It may be noted now that bank key was spoken of, not to be confused with the PIN code, which will in principle be different from the bank key and which protects access to the bank key.

Figure 1:
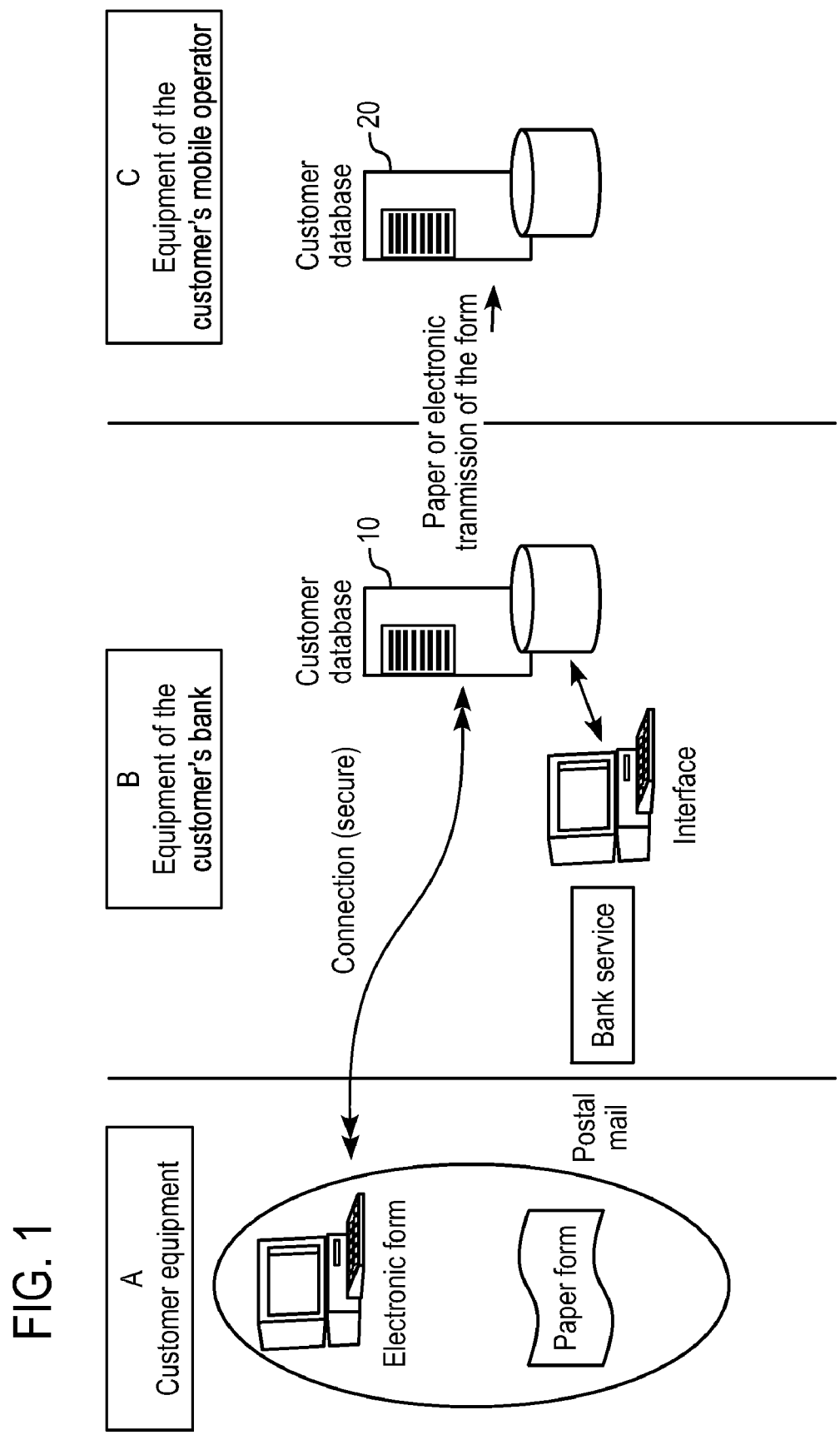
FIG. 1 illustrates the exchanges between the equipment of the customer, his bank and the telephone operator for the phase of registering a customer with his bank and his telephone operator in order to permit the electronic commerce.

The functional mechanism of registering a customer is illustrated by FIG. 1.

As has just been seen, the STK program is preferably loaded in the SIM card at the time of personalisation, by the card manufacturer. This program could be downloaded (Over The Air) on a terminal in any point of sale. However, the customer cannot use this payment application as long as it is not registered with organizations participating in the payment circuit.

The principal objectives of the registration are as follows:
ensuring that the bank data supplied by the customer are valid (for example, the account information for the account to be debited or the number of the bank card to be used and its expiry date). This information is sent either electronically or by post. The customer for this purpose sends a form (electronic over a secure or paper link) to his bank. This sending is represented by the exchange between the equipment A and B in FIG. 1.
the storage of the bank card data and the telephone numbers in the database 10 of the customer bank and on the management and invoicing system 20 of the equipment C of the telecommunications operator.
enabling the customer to know the bank identification code PIN code.

The customer has filled in a paper or electronic form and has sent it to his bank. The customer card can then be authenticated.

The issuing bank has the responsibility of authenticating the holder of the card. Next, through the authentication mechanism which must be accepted by the two parties (namely the bank and the telecommunications operator), the bank must inform the telecommunications operator concerned.

The telecommunications operator is then capable of activating the STK payment application through a radio link. This can be performed locally (for example by telephone) through a dedicated STK menu and an activation code which may be the bank identification code (PIN code). The card holder at this stage knows his code and can then enter it from the keypad of his mobile telephone.

As stated, once registered, the customer needs to know the bank identification code, that is to say his PIN code, in order to be able to use it subsequently in order to carry out electronic commerce. In addition, this bank identification code is additional security in the method proposed since it is necessary to trigger the signatures of a transaction. It thus protects access to the signature keys K1, K2 stored in the SIM card.

However, in order to provide the payment guarantee, the banks must be sure that this PIN code (bank identification code) is not known to the telecommunication operator. The management of this code and of the signature keys K1 and K2 is detailed below.

Figure 2:
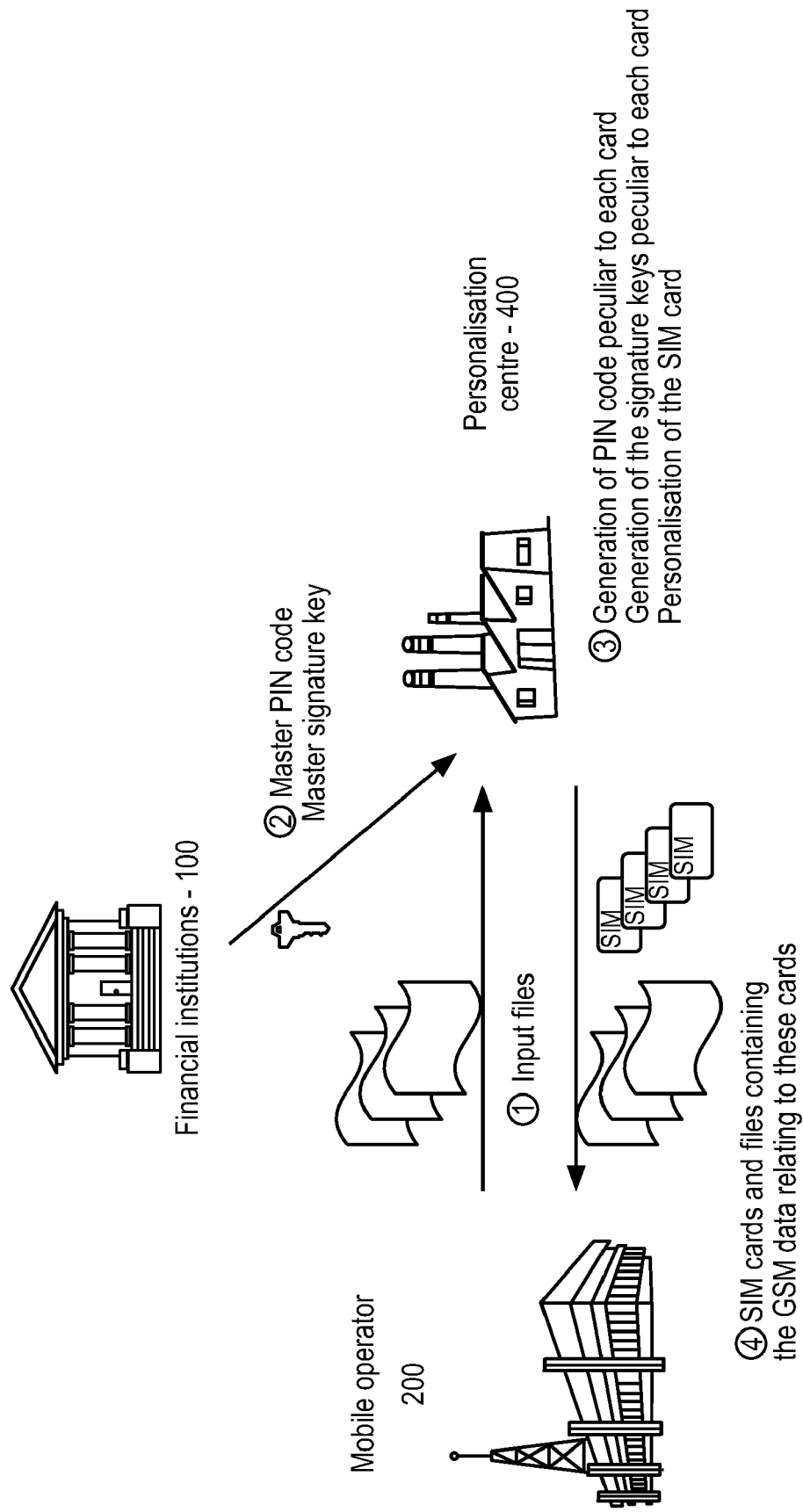
FIG. 2 illustrates the exchanges between the equipment of the bank, the smart card personalisation centre and the mobile operator, for the card personalisation phase.

FIG. 2 illustrates one possible solution of the steps leading to the generation of the PIN code during the personalisation of the SIM card and the generation of the signature keys K1 and K2.

At this step (generation of the keys), the end customer is not known. The PIN code is generally diversified using a master identification code generated by the bank 100. The personalisation centre 400 then generates the PIN code from the master code and a personal number of the card, namely the ICCid code (the identification number of the integrated circuit of the card) or from the IMSI (International Mobile Subscriber Identifier) code of the SIM card or any other possible identifier related to the SIM card. These codes are the identification codes of a subscriber to the international mobile telephone network.

When necessary, by virtue of dedicated software and the ICCid or IMSI code of the SIM card, the issuing bank is capable of calculating the bank identification code (PIN code) and sending it by electronic mail to the card holder.

A better solution derived from the latter can be based on a diversification using the master identification code and the telephone number of the subscriber.

Optionally, the bank code can be modified by the end customer (as is already the case with mobile telephones). However, in this case, the non-definitive code is in any event managed by the issuing bank and not by the telecommunication operator.

The management of the transactions will now be detailed.

Figure 3:
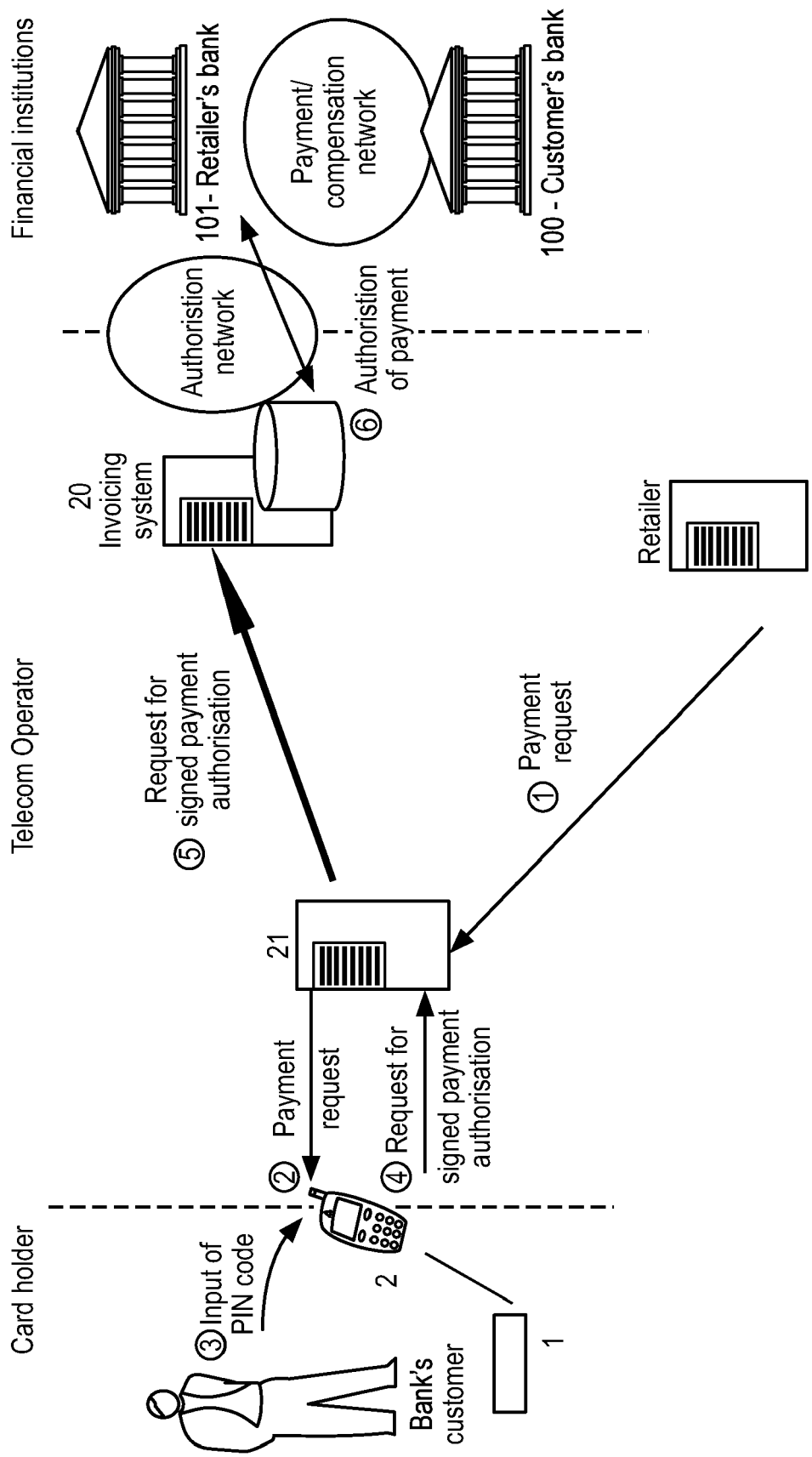
FIG. 3 illustrates the exchanges between the equipment of the customer, that of the telephone operator with which he is registered and that of the bank during a transaction.
Figure 4:
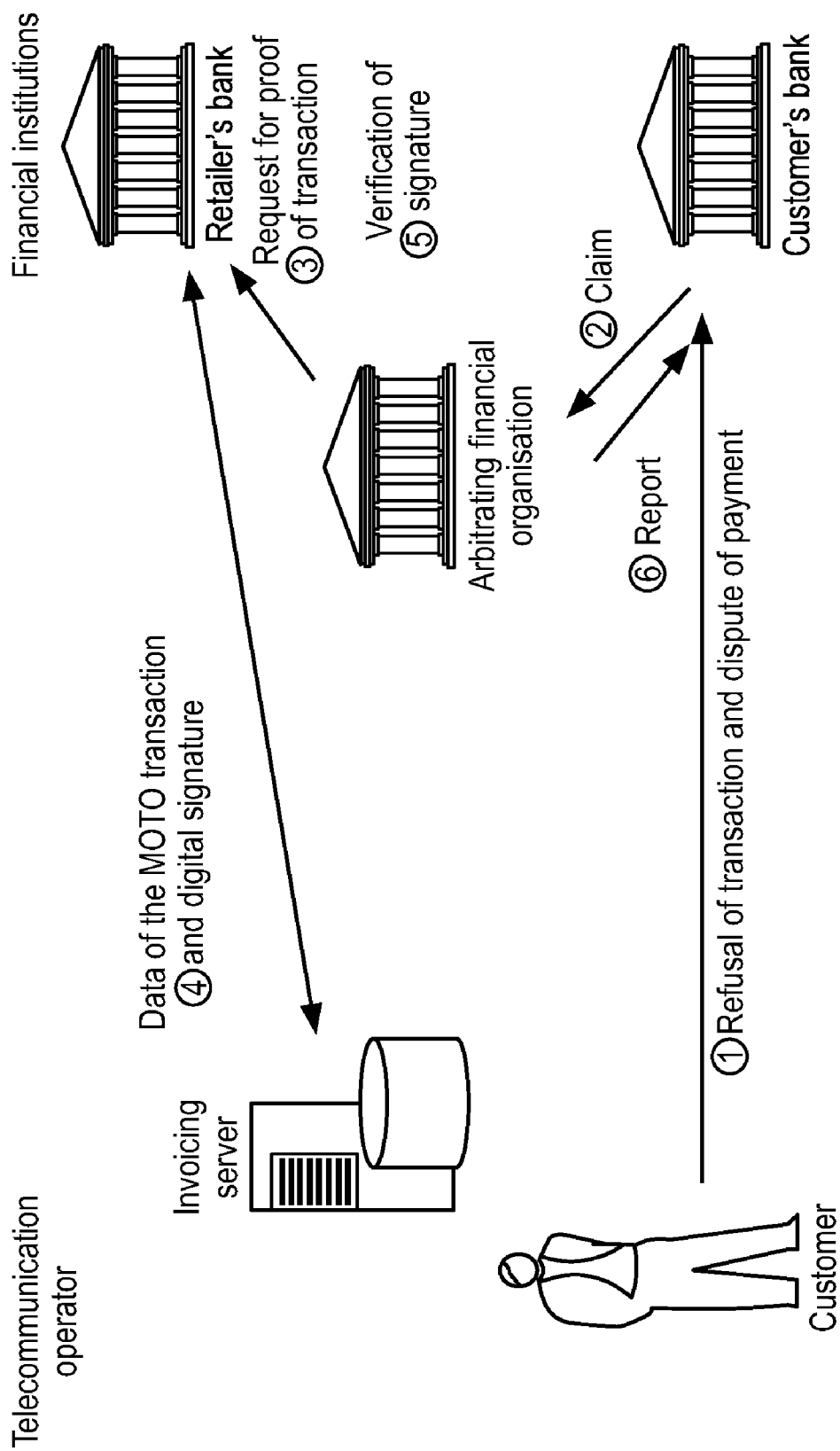
FIG. 4 illustrates the exchanges between all of the participants in the case of a payment dispute by the customer.

A functional diagram of the mechanism for changes made in the equipment A, B, C of the three participants, namely card holder, telephone operator and bank organizations, is depicted in FIG. 3.

The management and invoicing system 20 sends a payment demand (1) to the mobile telephone 2 through a server 21 able to convert this information into SMS short messages (2) or any other transportation protocol supported by the mobile intended for the mobile telephone.

The owner of the mobile telephone or rather the card holder accepts the transaction and for this purpose enters his PIN code. This triggers the process of calculating the two signatures relating to the characteristic data of the accepted transaction.

An SMS message is sent by the mobile telephone to the server 21. This message contains the certificates cert1 and cert2, that is to say the characteristic data of the transaction and the two signatures calculated by the SIM card. One signature was calculated with the key K1 and the other with the key K2.

As has been seen, each customer has two personal signature keys used for generating the signature relating to characteristics of the transaction. The data characteristics of a transaction are for example the amount of the transaction, the date, the time, the identification of the retailer and the telephone number.

To prevent the telecommunications operator from generating faked transactions, the secret bank key must not be known to the telecommunications operator. As stated, the use of this key K2 is protected by the PIN code within the SIM card.

The management of the payment requests can be carried out by the conventional MOTO system with off-line validation.

This is because, between the telephone operator and the receiving bank, the transaction can be carried out as a conventional MOTO transaction.

The mobile telephony operator must in addition store the data of the digital transaction including the digital signature cert1, in a dedicated database.

Provision is made for the telecommunication operator, in the event of any dispute, to be capable of returning the digital signature cert2 of the digital transaction to the bank of the customer.

The immediate advantage of the proposed solution is that the existing infrastructures for the payment authorization request do not need to be modified.

However, in the event of a dispute by the holder of a card, this dispute must be managed differently.

The digital signature cert2 is the proof of payment by the holder of the card.

The invention claimed is:

1. A method of making an electronic payment by a customer to a retailer over a telecommunication network using a customer device, wherein the customer device stores a key of an operator of the telecommunication network and a key of a bank, said method comprising:
    producing by the customer device a first certificate using the key of the operator of the telecommunication network;
    producing by the customer device a second certificate using the key of the bank;
    transmitting by the customer device, via the telecommunication network, the first certificate to the operator of the telecommunication network, and
    storing by the customer device the second certificate in a secure location accessible only by the bank.

2. The electronic payment method according to claim 1, wherein the certificates are produced by a smart card and the second certificate is stored within said smart card.

3. The electronic payment method according to claim 1, wherein the second certificate is transmitted to the network operator, who stores it on a database under the control of and/or with the approval of only the financial organization.

4. The electronic payment method according to claim 3, wherein the second certificate is sent to the financial organization by the network operator.

5. The electronic payment method according to claim 1, wherein the payment is made by means of a mobile telephone.

6. The electronic payment method according to claim 5, wherein:
    the mobile telephone comprises a subscriber identification smart card, and
    the network of the telecommunication network operator is equipped with an invoicing server,
    said method including the following steps:
    sending by the mobile telephone the two certificates to the telecommunication network operator, and
    authenticating by the invoicing server the holder of the card from the first certificate and sending a payment authorization to the financial organization.

7. An electronic payment device for making an electronic payment by a customer to a retailer over a telecommunication network, said electronic payment device comprising:
    means for storing a key of an operator of the telecommunication network;
    means for storing a key of a bank;
    means for producing a first certificate using the key of the operator of the telecommunication network;
    means for producing a second certificate using the key of the bank;
    means for transmitting the first certificate to the operator via the telecommunication network; and
    means for storing the second certificate in a secure location accessible only by the bank.

8. The electronic payment device according to claim 7, wherein said device comprises one of a microcomputer or a mobile telephone or a personal assistant.

9. The electronic payment device according to claim 7, wherein said device comprises a secure medium with an electronic chip.

10. The electronic payment device according to claim 9, wherein said electronic chip produces the certificates.

11. An invoicing server connected to a network of a telecommunication network operator for invoicing goods or at least one service supplied by a retailer to a customer performing at least one electronic transaction on the network by means of an electronic payment means, said invoicing server comprising:
    means for receiving from the electronic payment means a certificate of the network operator and a certificate of a bank, the certificate of the network operator and the certificate of the bank being produced by the electronic payment means using a key of the operator of the telecommunication network and a key of the bank, respectively, at the time of the electronic transaction;
    means for processing the transaction using the network operator certificate received from the electronic payment means; and
    means for storing the certificate of the bank under the control of only the bank.

* * * * *